United States Patent [19]

Newport

[11] 4,140,099
[45] Feb. 20, 1979

[54] FOLDABLE STOVE

[76] Inventor: Duane B. Newport, 1314 Oneida, Fort Wayne, Ind. 46809

[21] Appl. No.: 781,651

[22] Filed: Mar. 28, 1977

[51] Int. Cl.² .............................................. F24C 1/16
[52] U.S. Cl. ................................. 126/9 A; 126/9 R; 126/43
[58] Field of Search ............ 126/9 R, 9 A, 9 B, 25 R, 126/59, 43, 50; 248/174, 152; 220/7, 6; 99/422; 206/541, 546, 577

[56] References Cited

U.S. PATENT DOCUMENTS

| 497,275 | 5/1893 | Glasmann | 126/9 R |
|---|---|---|---|
| 1,001,051 | 8/1911 | Kohout | 220/6 |
| 1,310,830 | 7/1919 | Hothersall | 126/43 |
| 1,358,495 | 11/1920 | Aronson | 126/9 R |
| 2,326,648 | 8/1943 | Horr | 248/174 X |
| 2,875,683 | 3/1959 | Burns | 126/9 A |
| 2,981,249 | 4/1951 | Russell et al. | 126/9 A |
| 3,322,383 | 5/1967 | Weinberg | 248/174 |
| 3,385,282 | 5/1968 | Lloyd | 126/25 R |
| 3,448,735 | 6/1969 | Palmer | 126/25 R |

*Primary Examiner*—Irwin C. Cohen
*Attorney, Agent, or Firm*—Gust, Irish, Jeffers & Rickert

[57] ABSTRACT

A portable collapsible stove capable of being folded into a compact package which is made substantially entirely of thin metal sheet being folded along a pair of generally parallel fold lines thereby forming a horizontal cooking surface supported by a pair of sides, and which has a fuel support surface lying beneath the cooking surface and extending between and folded together with the sides, the fuel support surface including a pair of fold lines generally parallel to the first fold lines whereby the sides and fuel support surfaces may be folded beneath the cooking surface.

12 Claims, 10 Drawing Figures

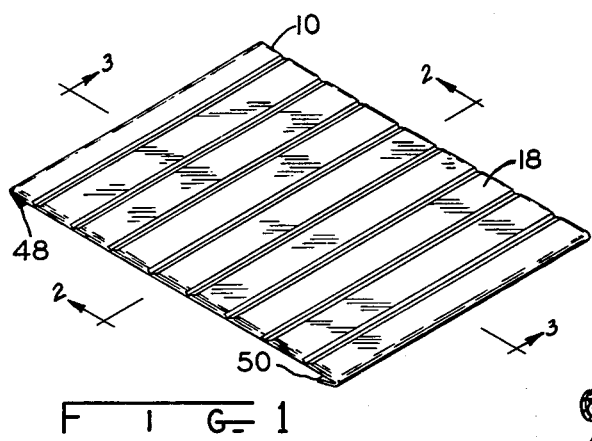
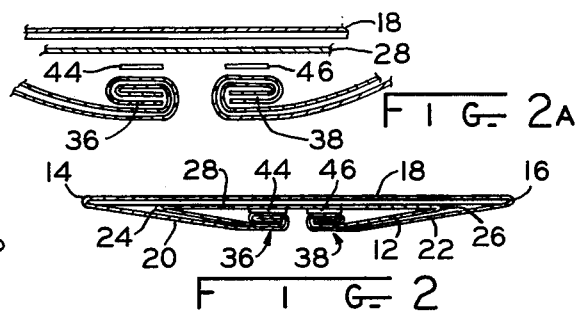
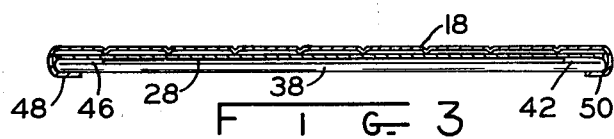
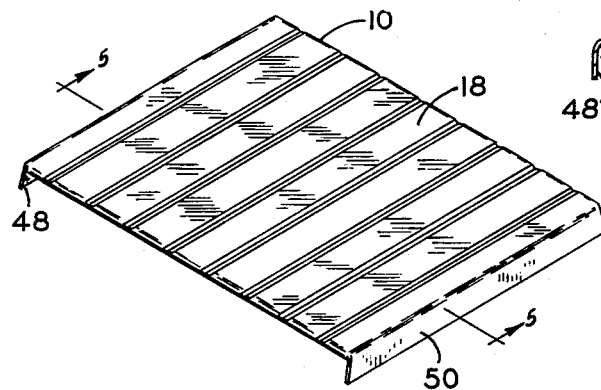
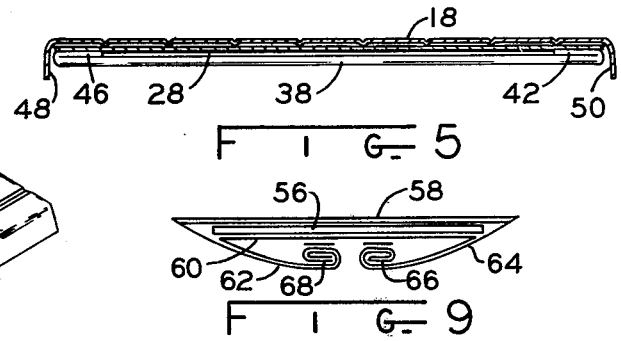
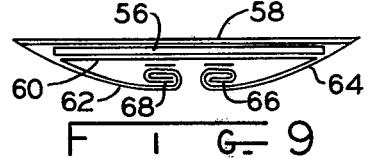
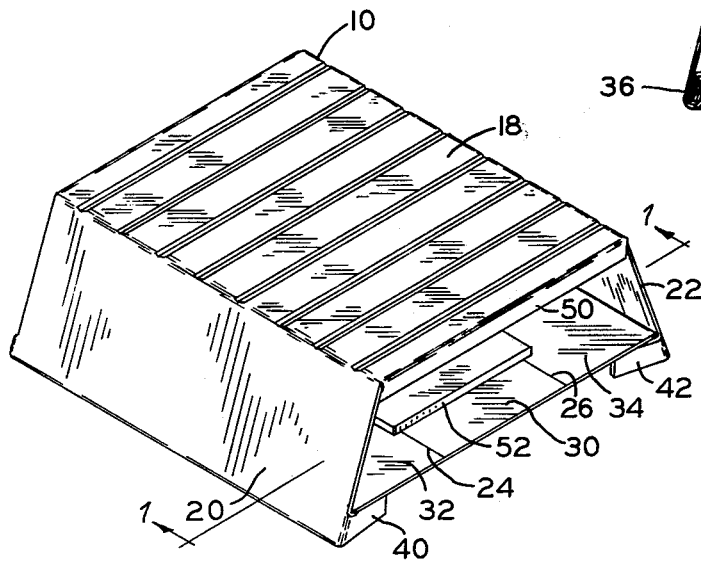
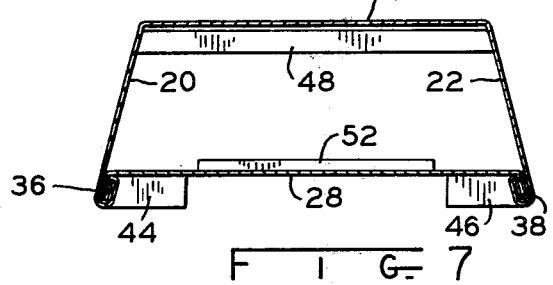
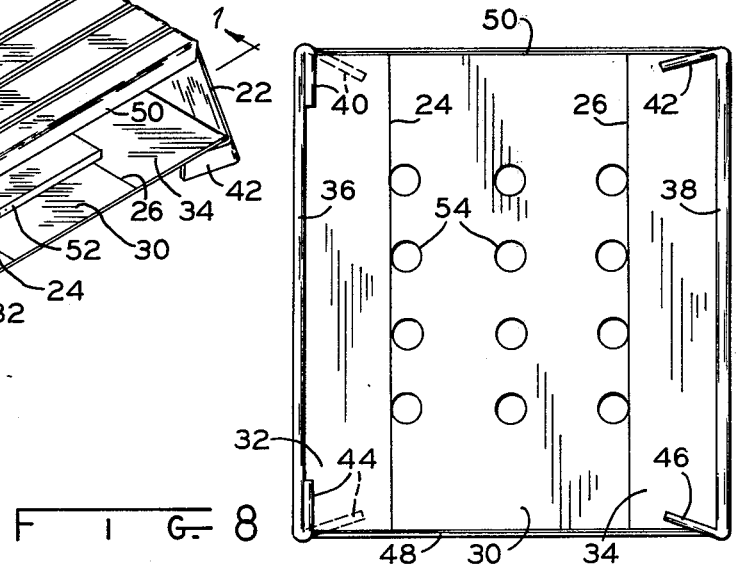

FOLDABLE STOVE

BACKGROUND OF THE INVENTION

The invention relates to a small portable stove made of lightweight material which may be folded into a compact unit for easy carrying.

More specifically, the present invention is contemplated for use by persons engaged in mountain climbing and backpack hiking and camping where all of the supplies and equipment must be carried on the person's back. Space limitations and the desirability of keeping the load as light as possible, dictate the use of compact, lightweight supplies and equipment as opposed to standard size camping equipment.

The present invention enables the camper to prepare hot meals without the necessity for carrying with him a full sized stove such as a gas stove or a charcoal or wood burning grill. Many of the foods which today are taken along by campers are pre-cooked and merely require heating before they are eaten so that a large stove is not necessary. Because full cooking is not required, there is no need for carrying a full complement of cooking utensils such as pots, pans, etc. and both meal preparation time and clean up is minimized. Since the food often comes in disposable containers, a stove which may also be thrown away after use is desirable. Furthermore, a stove which is disposable may have the fuel pellet or charcoal briquet packaged with it for one-time use.

SUMMARY OF THE INVENTION

The present invention is a portable collapsible stove made substantially entirely of heat resistant sheet material, the sheet material being folded along a pair of generally parallel first fold lines to form a planar cooking surface between the fold lines and pair of side support sections on either side of the fold lines, and having a fuel support surface lying beneath the cooking surface and extending between and folded together with the side support sections, the fuel support surface including a pair of second fold lines generally parallel to the first fold lines to form a planar lower center section between the second fold lines and parallel to the cooking surface.

It is an object of the present invention to provide a portable collapsible stove which is compact and lightweight yet of sturdy construction so that it is capable of supporting many times its own weight.

It is another object of the present invention to provide a portable collapsible stove wherein the fuel may be packaged with the stove to form a complete integrated heating device.

It is a further object of the present invention to provide a portable collapsible stove which is designed to be disposed of after use.

Another object of the present invention is to provide a portable collapsible stove which is simple in construction and made of inexpensive and readily available material so that it is capable of being produced rapidly and economically.

These and other objects of the present invention will be apparent from the following description considered together with the appropriate drawings.

BRIEF DESCRIPTION OF THE DRAWINGS

FIG. 1 is a perspective view of the present invention in its collapsed or folded state;

FIG. 2 is a sectional and partially exploded view taken along line 2—2 of FIG. 1 and viewed in the direction of the arrows;

FIG. 2A is an enlarged fragmentary view similar to FIG. 2;

FIG. 3 is a sectional view taken along line 3—3 of FIG. 1 and viewed in direction of the arrows;

FIG. 4 is a perspective view similar to FIG. 1 but with the side reinforcing flanges folded out;

FIG. 5 is a sectional view taken along line 5—5 of FIG. 4 and viewed in the direction of the arrows;

FIG. 6 is a perspective view similar to FIGS. 1 and 4 but with the stove completely erected;

FIG. 7 is a sectional view taken along line 7—7 of FIG. 6 and viewed in direction of the arrows;

FIG. 8 is a bottom plan view of the erected stove shown in FIG. 6; and

FIG. 9 is a diagrammatic view of a further embodiment of the stove of the present invention showing a fuel pellet packaged therewith.

DESCRIPTION OF THE PREFERRED EMBODIMENT

The stove of the present invention is preferably made of a heat resistant sheet material such as aluminum foil, thin sheet steel, or the like. In a preferred embodiment, the material is aluminum foil having a thickness of approximately 0.004 inches, which is similar to the gauge of material utilized in making pie tins and other disposable food containers.

In the embodiment illustrated in FIGS. 1-8, it comprises two rectangular sheets of aluminum foil 10 and 12 folded together in the manner shown in FIG. 2. Sheet 10 is folded at 14 and 16 so as to form a planar cooking surface 18 having side support sections 20 and 22. If desired, the stove may be pocket-sized in which case the dimensions of cooking surface 18 would be approximately 4 inches by 3 inches. Surface 18 is corrugated to provide greater strength and specifically includes ⅛ inch grooves spaced ¼ inch apart.

Sheet 12 is also folded at 24 and 26 so as to form a fuel support surface 28 comprising a center section 30, which always remains parallel to cooking surface 18, and side sections 32 and 34 on either side thereof. Sheets 10 and 12 are joined by means of a pair of rolled seams 36 and 38 as illustrated in FIG. 2 and 2A. Sheets 10 and 12, at the point where they are rolled to form seams 36 and 38, include tab portions 40, 42, 44, and 46 which assist in providing rigidity to the stove when erected as will be described in greater detail at a later point. Cooking surface 18 is also provided with a pair of reinforcing flanges or tabs 48 and 50 which serve to impart rigidity to the erected structure.

The stove is designed to be carried in its collapsed state as shown in FIGS. 1, 2, 3 and 5. In this state, the sides 20 and 22 are folded about fold lines 14 and 16, respectively, and the fuel support surface 28 is folded about fold lines 24 and 26 so that sides 20 and 22 and the lateral side sections 32 and 34 of surface 28 are folded beneath cooking surface 18. The tabs 40, 42, 44, and 46 and reinforcing flanges 48 and 50 are folded inwardly as best illustrated in FIG. 3.

To erect the stove for heating or cooking, reinforcing flanges 48 and 50 are folded outwardly to the positions shown in FIGS. 4 and 5, and the rolled seams 36 and 38 are pulled down and out so that fuel support surface 28 is unfolded and assumes the position shown in FIGS. 6 and 7. Reinforcing flanges 48 and 50 are then bent just inward of sides 20 and 22 and assist in maintaining surface 18 and sides 20 and 22 at the proper angle to each other. Tabs 40, 42, 44 and 46 are bent outwardly to the positions shown in FIGS. 6 and 7 and serve to provide some additional support underneath surface 28.

The fuel pellet, fuel cell, charcoal or other unit of fuel 52 may be positioned either underneath surface 28 or on top of it as shown in FIGS. 6 and 7. If the fuel pellet 52 burns at a temperature which is higher than that which is desired, it is best to place it beneath surface 28 which serves as a heat barrier to prevent overheating of the cooking surface 18. If desired, fuel support surface 28 may be provided with apertures or perforations 54 to assist in oxygen supply to the fuel 52.

The stove may also be sold as a complete integrated heating unit with the fuel pellet enclosed therein. Such an arrangement is illustrated in FIG. 9 where the fuel pellet 56 is sandwiched between the cooking surface 58 and the fuel support surface 60, and the sides 62 and 64 are folded inwardly in the manner described previously.

Another modification which is shown in FIG. 9 consists of making the stove from a single strip or sheet of material and differs in that the material is continuous within rolled seam 66. It is also possible to make the unit from a single band of strip material in which case the material would be continuous in rolled seam 68 as well. Accordingly, where the terms "joined" or "joining" are used in the claims, integral as well as non-integral construction is contemplated.

If the stove is to be reused, it may be again collapsed by folding tabs 40, 42, 44, and 46 inwardly against rolled seams 36 and 38, folding sides 20 and 22 and the side sections 32 and 34 of fuel support surface 28 underneath cooking surface 18, and then folding reinforcing flanges 48 and 50 underneath.

Although the present invention has been described by way of a specific embodiment, it is only exemplary and not intended to limit the scope of the invention.

What is claimed is:

1. A portable collapsible stove made substantially entirely of heat resistant sheet material, said sheet material being folded along a pair of generally parallel first fold lines to form a planar cooking surface between said fold lines and a pair of side support sections on either side of said cooking surface, and said sheet material having a substantially planar fuel support surface lying beneath said cooking surface and extending between and folded together with said side support sections, said fuel support surface including a pair of second fold lines generally parallel to said first fold lines to form a planar lower center section between said second fold lines and parallel to said cooking surface, said fuel support surface includes lateral sections on either side of said second fold lines, means hingedly joining said lateral sections to said side support sections, wherein when said stove is collapsed said side support sections are folded about said first fold lines underneath said cooking surface, and said fuel support surface is folded about said second fold lines with its said lateral sections folded underneath said cooking surface.

2. The stove of claim 1 wherein said cooking surface and said side support sections together comprise a first metal sheet, and said fuel support surface comprises a second metal sheet hingedly joined to said first metal sheet.

3. The stove of claim 2 wherein said first and second sheets are hingedly joined along a pair of rolled seams contiguous respectively to said side support sections.

4. The stove of claim 3 wherein said side support sections extend downwardly at an obtuse angle from said cooking surface, said fuel support surface is planar and parallel to said cooking surface, and said rolled seams extend downwardly from said fuel support surface so as to form supporting legs.

5. The stove of claim 1 wherein said fuel support surface lateral sections are folded beneath said fuel support surface center section between the latter and said side support sections.

6. The stove of claim 5 and including a quantity of solid fuel enclosed therein.

7. The stove of claim 3 including a plurality of tabs integral with said rolled seams and adapted to be folded beneath said fuel support surface.

8. The stove of claim 3 including a plurality of tabs integral with said cooking surface extending between said side support sections and adapted to be folded beneath said cooking surface.

9. The stove of claim 1 wherein said sheet material is metal sheet having a thickness of about 0.004 inch.

10. The stove of claim 1 wherein said sheet material is a single integral metal sheet.

11. The stove of claim 1 wherein said sheet material is a single metal band.

12. The stove of claim 1 wherein said fuel support surface includes a plurality of apertures.